United States Patent
Clerc et al.

(10) Patent No.: US 9,895,928 B2
(45) Date of Patent: Feb. 20, 2018

(54) SPHERICAL WHEEL INTENDED FOR MOVING A VEHICLE AND VEHICLE USING THE WHEEL

(71) Applicant: ALDEBARAN ROBOTICS, Paris (FR)

(72) Inventors: Vincent Clerc, Clamart (FR); Philippe Roux, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 0 days.

(21) Appl. No.: 15/106,174

(22) PCT Filed: Dec. 18, 2014

(86) PCT No.: PCT/EP2014/078560
§ 371 (c)(1),
(2) Date: Jun. 17, 2016

(87) PCT Pub. No.: WO2015/091856
PCT Pub. Date: Jun. 25, 2015

(65) Prior Publication Data
US 2016/0318337 A1 Nov. 3, 2016

(30) Foreign Application Priority Data

Dec. 20, 2013 (FR) ...................................... 13 63339

(51) Int. Cl.
*B60B 19/14* (2006.01)
*B60B 33/08* (2006.01)
(Continued)

(52) U.S. Cl.
CPC .............. *B60B 19/14* (2013.01); *B60B 33/08* (2013.01); *B62D 61/06* (2013.01); *B60B 37/04* (2013.01);
(Continued)

(58) Field of Classification Search
CPC ........................... B60Y 2200/80; B60B 19/14
See application file for complete search history.

(56) References Cited

U.S. PATENT DOCUMENTS 2,812,031 A * 11/1957 Aghnides ................ B60B 19/14
152/454
3,128,814 A * 4/1964 Rohland ................... B60B 9/00
152/196
(Continued)

FOREIGN PATENT DOCUMENTS

DE 2945325 A1 * 5/1981 ............. B60B 19/00
DE 29510627 U1 * 9/1995 ............. B60B 19/14
(Continued)

*Primary Examiner* — Nicole T Verley
(74) *Attorney, Agent, or Firm* — Baker & Hostetler LLP (57) ABSTRACT

A spherical wheel to move a vehicle comprises two caps, the surface of which follows the spherical surface of the wheel, the caps being articulated by means of a pivot link relative to a shaft. The wheel further comprises two casters each arranged in an opening of each of the caps, the opening centered about the axis of the corresponding pivot link, each caster arranged in the extension of the pivot link of the cap concerned. Each caster ensures a rolling at the level of the spherical surface. Radii S of the opening of each cap and r of the corresponding caster are defined to substantially balance forces needed to drive a cap and the corresponding caster when the wheel goes from bearing on the ground on a cap at the edge of the opening to bearing on the ground on the corresponding caster.

12 Claims, 7 Drawing Sheets

(51) Int. Cl.
  *B62D 61/06* (2006.01)
  *B60B 37/04* (2006.01)
(52) U.S. Cl.
  CPC ..... *B60B 2900/551* (2013.01); *B60Y 2200/80* (2013.01)

(56) References Cited

U.S. PATENT DOCUMENTS

| | | | | |
|---|---|---|---|---|
| 3,695,375 | A * | 10/1972 | Splawinski | ............. B60B 19/14 180/218 |
| 2002/0185907 | A1* | 12/2002 | Zimet | ...................... A47L 9/009 301/5.1 |
| 2005/0001576 | A1* | 1/2005 | Laby | ........................ B25J 5/007 318/568.12 |
| 2009/0152858 | A1* | 6/2009 | Legrand | .................. B60B 19/14 281/15.1 |
| 2014/0252844 | A1* | 9/2014 | Riwan | .................. B60B 19/003 301/6.1 |
| 2015/0129340 | A1* | 5/2015 | Maisonnier | ............. B60B 19/14 180/210 |

FOREIGN PATENT DOCUMENTS

| | | |
|---|---|---|
| FR | 2 989 935 A1 | 11/2013 |
| JP | 2007-210576 A | 8/2007 |
| NL | 7 906 664 A | 3/1981 |
| WO | 2013/164327 A1 | 11/2013 |

\* cited by examiner

SPHERICAL WHEEL INTENDED FOR MOVING A VEHICLE AND VEHICLE USING THE WHEEL

CROSS-REFERENCE TO RELATED APPLICATIONS

This application is a National Stage of International patent application PCT/EP2014/078560, filed on Dec. 18, 2014, which claims priority to foreign French patent application No. FR 1363339, filed on Dec. 20, 2013, the disclosures of which are incorporated by reference in their entirety.

FIELD OF THE INVENTION

The invention relates to a spherical wheel intended to move a vehicle and a vehicle using the wheel.

BACKGROUND

Conventionally, four-wheel vehicles are equipped with directional wheels enabling them to change direction. The wheels are linked to the vehicle by means of pivot links and, in the case of directional wheels, an additional degree of freedom in rotation is added. When the directional wheels are drive wheels, universal joints make it possible to drive the wheels while making it possible to modify the orientation of the axis of the pivot link. This type of configuration does not make it possible to produce small turn radii. In other words, it is impossible to pivot the vehicle in place without speed.

Moreover, attempts have been made to produce a vehicle that has spherical wheels that can each pivot on itself. An example of such production is described in the patent application published under the number JP 2007-210576. This document describes a wheel comprising two hemispheres. The wheel is actuated by a horizontal motor shaft which rotationally drives a support bearing the two hemispheres. The latter are mounted on the support, each via a pivot link. The two pivot links are aligned. Their common axis is at right angles to the axis of rotation of the motor shaft. A vehicle, such as a robot, can be equipped with four wheels as described in the document JP 2007-210576. The axes of the motor shafts of four wheels are then arranged at right angles to one another. The wheels are then aligned in pairs. The driving of two wheels of a first pair makes it possible to move the vehicle in a direction at right angles to the common axis of that pair of wheels. For the second pair of wheels, the hemispheres revolve freely about their pivot link. A movement of the robot in a direction at right angles is obtained by driving the wheels of the second pair. Combined movements are of course possible. This makes it possible for the vehicle to be displaced in any direction and even to revolve on itself.

The drive shaft of a wheel penetrates into the wheel by an equatorial plane of the wheel, situated between the two hemispheres. The equatorial plane is defined by analogy to the terrestrial sphere. This plane separates the two hemispheres that can be likened to the north and south terrestrial hemispheres. The motor shaft must have a certain rigidity which imposes on it a minimum diameter. The two hemispheres are therefore separated by at least this diameter. In practice, a functional play preventing the hemispheres from rubbing against the motor shaft must be added to the diameter of the shaft. Two hemispheres each delimited by a plane are therefore obtained. The planes of the two hemispheres are parallel and arranged at a distance that cannot be reduced without the risk of impairing the rigidity of the motor shaft.

When the equatorial plane of the wheel is in vertical position relative to the ground, that is assumed horizontal, a discontinuity of the bearing of the wheel on the ground appears. More specifically, when the wheel is a drive wheel, the equatorial plane of the wheel comes, on each wheel revolution, into contact with the ground and leads to a ground bearing transition from one hemisphere to the other and therefore from a plane of one hemisphere to the other. In the transition through this discontinuity, a loss of grip may occur, the sphericity of the wheel is momentarily lost and, at high speed, a noise occurs on each transition.

In the French patent application FR 12-53981 filed on Apr. 30, 2012 in the name of the applicant, another spherical wheel, closely related to that described in the document JP 2007-210576, was proposed. This other spherical wheel reduces the drawback of the discontinuity in the transition through the equatorial plane of the wheel by making the planes delimiting the two hemispheres secant. In practice, the term "hemisphere" can no longer be used and is replaced by the term "cap" to define the two wheel parts of which each of the surfaces follows the spherical surface of the wheel. The "caps" are each articulated by means of a pivot link relative to the motor shaft of the wheel. The two caps are each delimited by a plane and the two planes are secant. In other words, the axes of the two pivot links are no longer aligned.

These two implementations exhibit a singularity when the axis of one of the pivot links is at right angles to the ground. In this configuration, if the vehicle using the wheel has a speed vector that is not at right angles to the driving axis of the wheel concerned, the latter slips at its point of contact with the ground. To avoid this slip, each cap (or hemisphere) comprises a caster arranged in the extension of the pivot link of the cap concerned and that ensures a rolling on the spherical surface. The casters have a degree of freedom in rotation about an axis at right angles to the driving axis of the wheel. This rotational movement is sufficient to avoid the slipping of the wheel in a singularity configuration. The casters each have a rolling line which follows the spherical surface of the wheel.

Both in the document JP 2007-210576 and in the French patent application FR 12-53981, the casters are as small as possible in order to keep the cap surfaces as large as possible for the wheel. In effect, the wheel can be a drive wheel only when it is in contact on the ground on the surface of its caps. There is therefore an incitement to reduce to the maximum the dimensions of the casters, notably to reduce as far as possible the circular opening produced in each of the caps to allow the respective casters to pass.

Tests performed in-house by the applicant have demonstrated that, on the transition through the singularity, the speed of rotation of the cap concerned changed very significantly, which presents a drawback because of the inertia of the cap. More specifically, for a constant linear speed of the vehicle, the speed of rotation of a cap in contact with the ground can change from a minimum value when the rotation of the cap takes place at the level of the plane which limits it to a maximum value when the rotation of the cap takes place at the level of the edge of the opening formed for the passage of the caster. Still for a constant linear speed of the vehicle, it is possible to have a sequence stringing together different points of contact with the ground:

contact with the ground on the plane delimiting the cap, transition through the edge of the opening, rolling on the caster, transition again through the edge of the opening, and finally return to the plane delimiting the cap.

Upon the first transition through the edge of the opening, the speed of rotation of the cap about its pivot link takes place in a direction which has to be reversed at the moment of the second transition through the edge of the opening to avoid any friction of the cap on the ground. The inertia of the cap can interfere with this reversal of direction of rotation. This interference is all the greater when the dimensions of the opening are small because of the high speeds of rotation achieved by the cap. This interference is further amplified with an increase of the linear speed of the vehicle. In effect, this increase of linear speed tends to increase the speed of rotation of the cap and reduce the time available for the reversal of speed of rotation in the vicinity of the singularity. These abrupt changes of speed for the cap necessitate, as for the caster, a significant input of kinetic energy and can generate risks of friction between the wheel and the ground.

SUMMARY OF THE INVENTION

The invention aims to reduce the speed of rotation of the cap in the vicinity of the singularity. To this end, the subject of the invention is a spherical wheel of radius R intended to move a vehicle, the wheel being driven in rotation by a shaft that can rotate about an axis, the wheel comprising two caps, the surface of which follows the spherical surface of the wheel and each delimited by a plane, the caps each being articulated by means of a pivot link relative to the shaft about an axis at right angles to the plane of the cap concerned, the wheel further comprising two casters each arranged in an opening of each of the caps, the opening being circular and centered about the axis of the corresponding pivot link, each caster being arranged in the extension of the pivot link of the cap concerned, each caster being free to rotate about an axis at right angles to the axis of the shaft, each caster ensuring a rolling at the level of the spherical surface, characterized in that the opening of each cap has a radius S about the axis of its pivot link and in that the radii S of the opening of each cap and r of the corresponding caster are defined so as to substantially balance forces needed to drive a cap and the corresponding caster when the wheel goes from bearing on the ground on a cap at the edge of the opening to bearing on the ground on the corresponding caster.

A rolling line of the casters occupies an angular sector centered on the center of the spherical wheel. This angular sector is advantageously greater than 35°.

Another subject of the invention is a vehicle comprising at least three wheels according to the invention. The axes of the shafts of at least two wheels are not aligned.

Other tests carried out in-house by the applicant have demonstrated that, on the transition through the singularity, a small diameter of the caster leads to an increase in its angular speed for a same linear speed of the vehicle. Since the caster is not driven and is free about its axis of rotation, it is the movement of the vehicle which has to drive the caster. On the transition through the singularity, the caster has to go from a zero speed to a significant speed. Because of the inertia of the caster, frictions can occur between the caster and the ground. Furthermore, the rapid change in the speed of rotation of the caster necessitates, once again, an input of kinetic energy in a very short time at the moment when the contact of the wheel on the ground leaves the cap for the caster. This input of energy can generate jerks in the movement of the vehicle.

Since the kinetic energy is a function of the square of the rotation speed of the caster, the invention advantageously aims to reduce this input of energy by virtue of an increase in the diameter of the caster which leads to a reduction of the kinetic energy needed to drive the caster. The invention obviously makes it possible to reduce the risks of friction which could occur in the rotational driving of the caster. The invention is of great use at high vehicle speeds.

To this end, a greater radius r of each of the casters about its respective axis is greater than a quarter of the radius R of the spherical wheel. This feature concerning the radius r of the casters already offers an advantage even if the angular sector defined above and occupied by the casters is less than 35°.

BRIEF DESCRIPTION OF THE DRAWINGS

The invention will be better understood and other advantages will become apparent on reading the detailed description of an embodiment given by way of example, the description being illustrated by the attached drawing in which.

For clarity, the same elements will bear the same references in the different figures.

DETAILED DESCRIPTION

Figure 1:
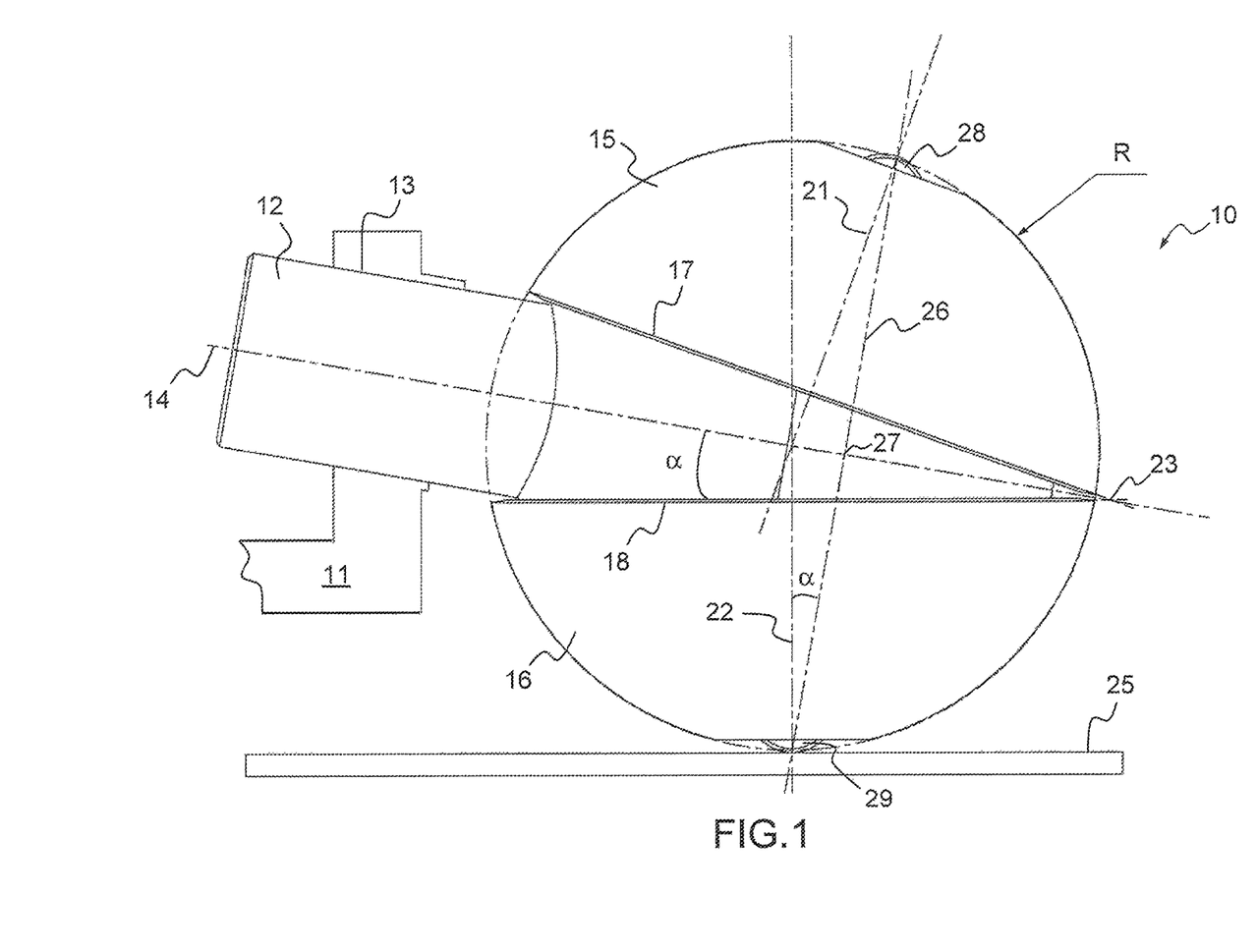
FIGS. 1 and 2 represent a first variant spherical wheel according to the invention.
Figure 2:
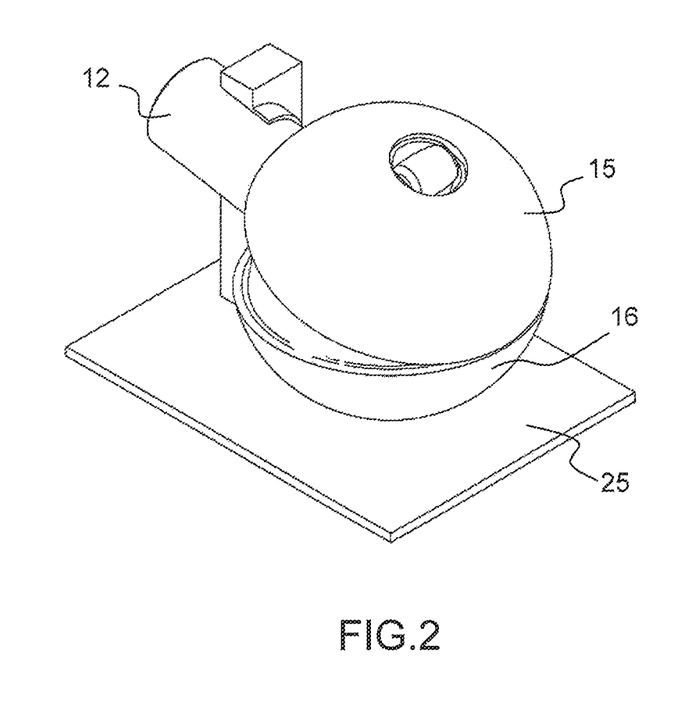

FIGS. 1 and 2 represent a spherical wheel 10 of radius R intended to move a vehicle 11. FIG. 1 is a profile representation and FIG. 2 a perspective representation. The wheel 10 is driven in rotation by a shaft 12. The vehicle 11 is represented by its shell and the shaft 12 is linked to the shell by a pivot link 13. The axis of rotation of the shaft 12 bears the reference 14.

The wheel 10 comprises two caps 15 and 16, the outer surface of which follows the spherical surface of the wheel 10. The cap 15 is delimited by a plane 17 and the cap 16 is delimited by a plane 18. The caps 15 and 16 are each articulated by means of a pivot link, respectively 19 and 20, relative to the shaft 12. The axis 21 of the pivot link 19 is at right angles to the plane 17 of the cap 15 and the axis 22 of the pivot link 20 is at right angles to the plane 18 of the cap 16. The two pivot links 19 and 20 are arranged inside their respective cap and will be detailed later.

It is possible to produce caps 15 and 16 that are different, but, advantageously, the latter are identical and arranged symmetrically relative to the shaft 12. In other words, the planes 17 and 18 are secant along a line having a point of intersection 23 with the axis 14 of the shaft 12. In this configuration, the axes 21 and 22 of the two pivot links 19 and 20 are secant and form a non-zero angle between them.

The wheel 10 is intended to roll on the ground referenced 25 in FIGS. 1 and 2. One of the two caps 15 or 16 is in contact with the ground 25. When the shaft 12 drives the wheel 10, the latter maintains a contact with the ground 25 according to a circle 26 of the spherical surface of the wheel 10. In this movement, the vehicle has a speed vector at right angles to the axis 14 at the point of intersection 27 between the axis 14 and a plane containing the circle 26. When the speed vector of the vehicle 11 applied at the point 27 is not at right angles to the axis 14, the cap which is in contact with the ground starts to revolve freely about its pivot link.

In other words, the cap in contact with the ground 25 can be driven by two movements: a first driving rotation about the axis 14 and a second rotation about the axis of its pivot link. The two rotations can of course be combined depending on the direction of the speed vector of the vehicle at the point 27.

Figure 3:
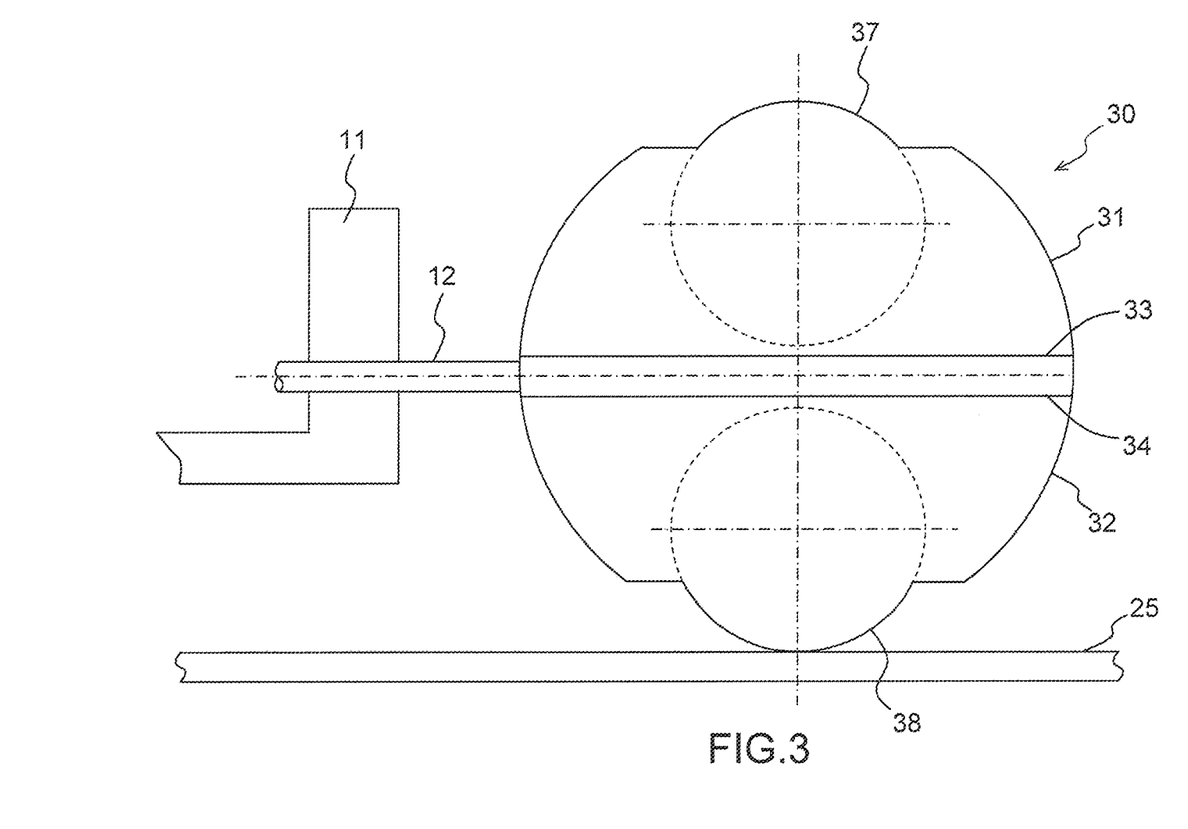
FIG. 3 represents a second variant spherical wheel according to the invention.

FIG. 3 represents a variant spherical wheel 30 driven in rotation by a shaft 12 leaving a vehicle 11. The wheel 30 comprises two caps 31 and 32, the surface of which follows the spherical surface of the wheel 30. The cap 31 is delimited by a plane 33 and the cap 32 is delimited by a plane 34. Unlike the wheel 10, the planes 33 and 34 are parallel to one another and parallel to the axis 14 of the shaft 12. In this variant, the axis 12 is parallel to the ground 25, assuming that the ground 25 is flat.

In the operation of the wheels 10 and 30, a singularity occurs when the cap in contact with the ground 25, the cap 16 in FIG. 1 or the cap 32 in FIG. 3, has its plane, respectively 18 and 34, horizontal.

In this configuration, if the vehicle of FIG. 1 has a vector applied at the point 27 that is not at right angles to the axis 14, then the cap 16 cannot revolve about its pivot link 20 and slips on the ground 25. To avoid this slip, the wheel 10 comprises two casters 28 and 29, a caster being associated with each of the caps. Each caster is arranged in the extension of the pivot link of the cap concerned and ensures a rolling on the spherical surface of the wheel 10. More specifically, the cap 15 is equipped with the caster 28 and the cap 16 with the caster 29. The casters 28 and 29 can have a single degree of freedom in rotation about an axis at right angles to the axis 14. This rotational movement is sufficient to avoid the slip of the wheel in a singularity configuration. The casters each have a rolling line which follows the spherical surface of the wheel 10.

The same applies for the wheel 30 which comprises two casters 37 and 38, a caster associated with each of the caps, respectively 31 and 32.

The rest of the description is given in relation to the variant wheel 10 represented in FIGS. 1 and 3. The features presented apply also to the wheel 30.

Figure 4:
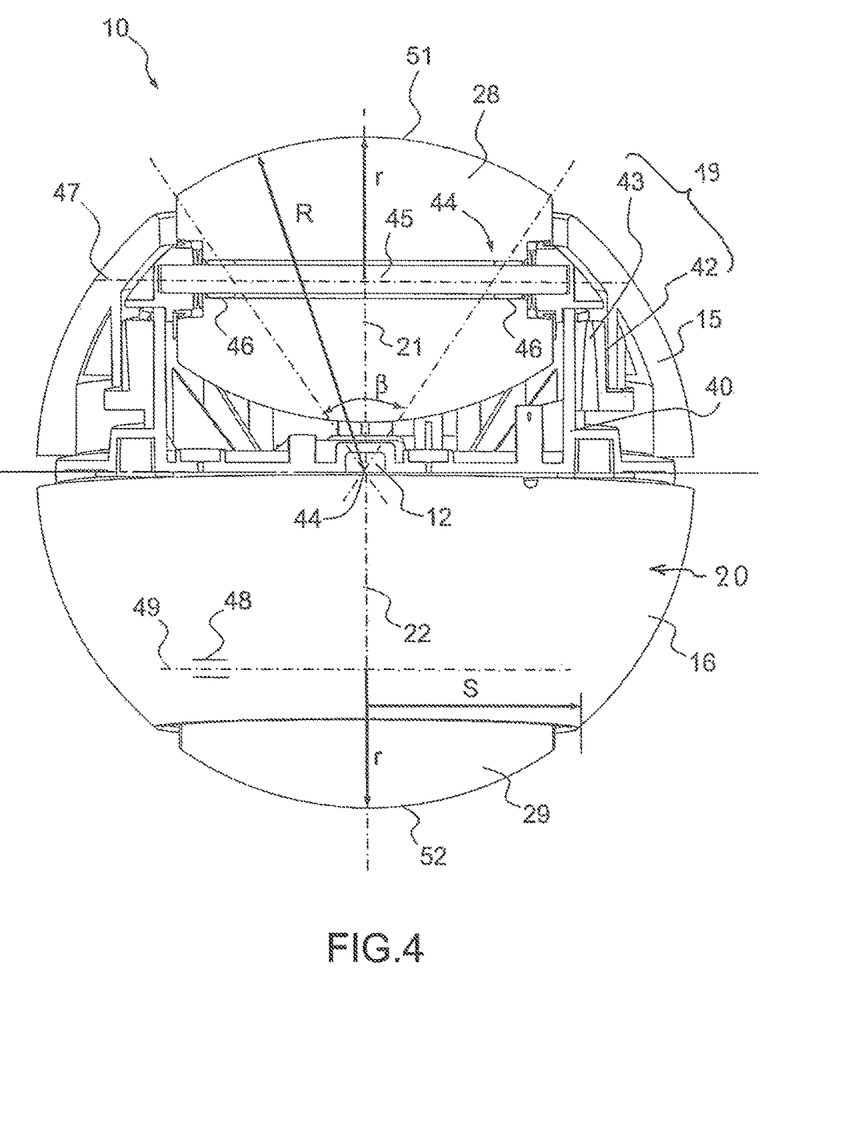
FIG. 4 represents, in partial cross section, the wheel of FIGS. 1 and 2.

FIG. 4 represents, in partial cross section, the wheel 10 in a plane containing the axes of rotation of the two casters 28 and 29. Only the cap 15 is cut. The wheel 10 comprises a support 40 secured to the shaft 12. The support 40 revolves around the axis 14 with the shaft 12.

The pivot link 19 links the support 40 and the cap 15. The pivot link 19 is formed by a bearing 42. Similarly, the pivot link 20, concealed in FIG. 4, links the support 40 and the cap 16. It is of course possible to use a number of bearings for each cap depending on the rigidity sought for the wheel 10. In this embodiment, the bearing 42 is formed by means of a spacer 43 interposed between the support 40 and the cap 15. The spacer 43 is for example produced in a material that makes it possible to obtain a low friction coefficient. It is for example possible to use polytetrafluoroethylene. The two pivot links 19 and 20 are advantageously identical. Other embodiments of the bearings are possible. It is for example possible to use rolling bearings to limit the resisting torque in the rotation of the pivot links 19 and 20.

A pivot link 44 links the caster 28 and the shaft 12 via the support 40. The pivot link 44 allows the caster 28 to revolve freely about an axis 47. The pivot link 44 is for example produced by means of a shaft 45 borne at its two ends by the support 40. The caster 28 is passed through by the shaft 45. The caster 28 revolves freely relative to the shaft 45. Bushes can be placed between the shaft 45 and the caster 28. As for the spacer 43, the bushes can be produced in a material with low friction coefficient such as, for example, polytetrafluoroethylene.

Similarly, a pivot link 48, similar to the pivot link 44 and concealed in FIG. 4, links the caster 29 and the shaft 12 via the support 40. This pivot link enables the caster 29 to revolve freely about an axis 49.

The casters 28 and 29 are barrel-shaped so that their respective rolling link 51 and 52, visible in FIG. 4, follows the spherical form of the wheel 10. A rolling line 51 or 52 is a curve formed on the surface of a caster 28 or 29, a curve that is furthest away from the axis 14. On a caster, the rolling line moves on the surface of the caster according to its rotation. The rolling line of a caster is a circle portion formed on the spherical surface of the wheel 10. The rolling line 51 is situated in a plane at right angles to the plane 17 delimiting the cap 15. Similarly, the rolling line 52 is situated in a plane at right angles to the plane 18 delimiting the cap 16.

Figure 5:
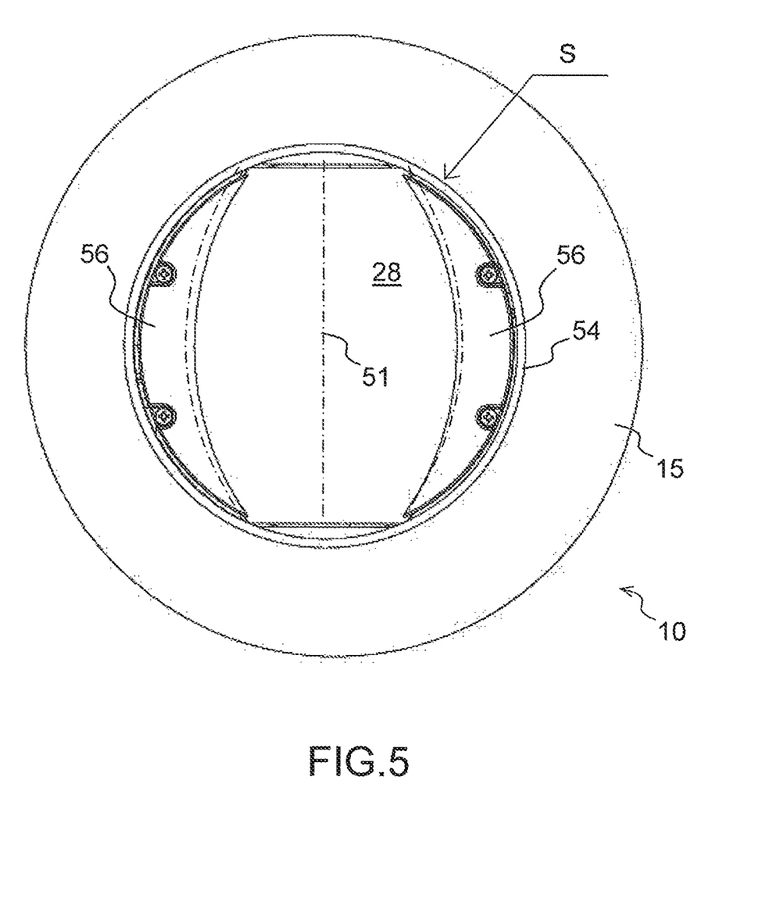
FIG. 5 represents another external view of the wheel of FIGS. 1 and 2.

FIG. 5 represents a view of the wheel 10, the view being centered on one of the casters, for example the caster 28. The caster 28 appears in a circular opening 54 produced in the cap 15 and centered on the axis 21. The opening of each cap has a radius S about the axis of its corresponding pivot link.

To avoid abrupt changes of speed for the cap 15 when the bearing of the wheel 10 on the ground leaves the cap 15, moves to the caster 28 and finally returns to the cap 15, the length of the rolling line 51, and consequently the diameter S of the opening 54, is increased. The rolling line 51 or 52 of each of the casters 28 and 29 occupies an angular sector β centered on the center of the spherical wheel. Advantageously, the angular sector β is greater than 35°. Tests in-house have shown that an optimum angular sector value lies between 45° and 50°. By construction, it is possible to produce a maximum angular sector of 130°. The value retained depends on the inertias of the different moving parts and the frictions between these different parts.

The greatest radius of each of the casters 28 and 29 about their axis, respectively 47 and 49, is denoted r. In order to limit the speed of rotation of the casters 28 and 29, it is possible to increase the radius r of the casters 28 and 29. Tests in-house have shown that when the radius r of each of the casters 28 and 29 is greater than a quarter of the radius R of the spherical wheel 10, the reduction in speed of the casters is already notable.

It is possible to achieve a radius r equal to half the radius R of the spherical wheel 10 by means of a particular arrangement of the shaft 12 and of the support 40. The shaft 12 would then have an end that does not reach the center of the sphere. In the configuration where the radius r is equal to half the radius R, the two casters 28 and 29 touch. This makes it possible to increase the inertia of the caster which is in contact with the ground 25. More specifically, when one of the casters enters into contact with the ground, its rotation drives the other caster. The inertia obtained is substantially doubled compared to the inertia of just one caster.

Other intermediate values of proportions between the radii r and R can also be envisaged. While, from a radius r equal to a quarter of the radius R of the sphere, the reduction in the speed of rotation of the caster is already advantageous, it has been found that, when the maximum radius r of each of the casters 28 and 29 about its respective axis 47 and 49 is greater than a third of the radius R, the reduction in the speed of rotation of the caster is particularly advantageous.

It is of course possible to produce this same structure for the casters 27 and 38 of the spherical wheel 30.

The radius r of the casters and the angular sector β occupied by the rolling line of the casters can be optimized independently of one another. Moreover, the radius S of the opening 54 is linked to the angular sector β in order to reduce to the maximum the functional play between the caster and its opening. It is advantageous to balance the forces needed to drive a cap and a corresponding caster when the wheel 10 goes from a cap bearing on the ground at the edge of its opening to a bearing on the ground on the corresponding caster and vice-versa. That makes it possible to avoid abrupt variations of the force between the wheel 10 and the ground at the moment of transition, such a variation of force being reflected in a jerk on the shaft 12 and therefore on the vehicle equipped with the wheel 10.

Once the materials are chosen, the balancing of the forces is done mainly by means of the relative dimensions of the radius S of the opening and the radius r of the corresponding caster. To be more concise, the radii S of the opening of each cap and r of the corresponding caster are defined so as to substantially balance forces needed to drive a cap and the corresponding caster when the wheel goes from bearing on the ground on a cap at the edge of the opening to bearing on the ground on the corresponding caster.

For each cap, it is possible to define a friction torque $Cf_c$ at the level of the pivot link between the cap concerned and the shaft 12 and, more specifically, with the support 40. Similarly, it is possible to define, for each caster, a friction torque $Cf_r$ in its freedom to rotate relative to the shaft 12.

It is advantageous to obtain a static balancing of the friction forces due to the two pivot links 19 and 44 or 20 and 48. The static balancing is obtained by defining the radii S of the opening of the cap and r of the corresponding caster so that the following equality is substantially observed:

$$Cf_c/S = Cf_r/r$$

Moreover, it is advantageous to obtain a dynamic balancing of the forces. The forces are a function of the inertia of the cap and of the corresponding caster. These two inertias are a function of the materials and of the dimensions of the cap and of the corresponding caster. The caps and the casters are defined so as to substantially balance the kinetic energies of a cap and of the corresponding caster when the wheel goes from bearing on the ground on the cap at the edge of the opening to bearing on the ground on the caster.

More specifically, for each cap, a moment of inertia is defined about the axis of its pivot link between the cap concerned and the shaft. For each caster, a moment of inertia $I_r$ is defined about the axis its freedom to rotate relative to the drive shaft 12 of the wheel 10. The dimensions and the materials of the caps 15 and 16 and of the casters 28 and 29 are defined for the following equality to be substantially observed:

$$\frac{Ic.\omega c}{2} = \frac{Ir.\omega r}{2}$$

ωc representing the speed of rotation of the cap when the wheel is bearing on the ground on the cap at the edge of the opening and ωr representing the speed of rotation of the caster when the wheel goes from bearing on the ground on the cap at the edge of the opening to bearing on the ground on the caster.

Figure 6:
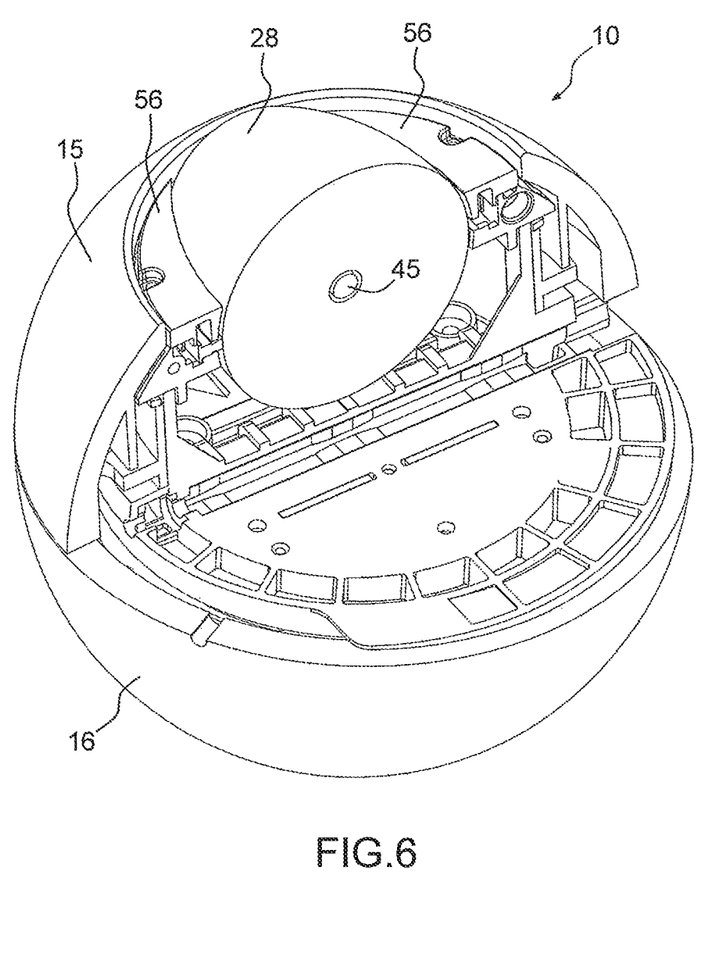
FIG. 6 represents, in perspective and in partial cross section, the wheel of FIGS. 1 and 2.

Advantageously, the wheel comprises two covers 56 associated with each caster and fixed to the shaft 12 via the support 40. FIGS. 5 and 6 illustrate the two covers 56 associated with the caster 28. The covers 56 each have the form of a flat crescent parallel to the plane 17. The covers 56 partly cover the caster 28 from the opening 54. The covers 56 both extend symmetrically relative to the rolling line 51. The covers 56 are secured to the support 40. The covers 56 make it possible to limit the ingress of particles into the wheel 10 through the opening 54. Nevertheless, a functional play is provided between the covers 56 and the cap 15 to allow the rotation of the cap 15 about its pivot link 19 without rubbing against the covers 56.

Figure 7:
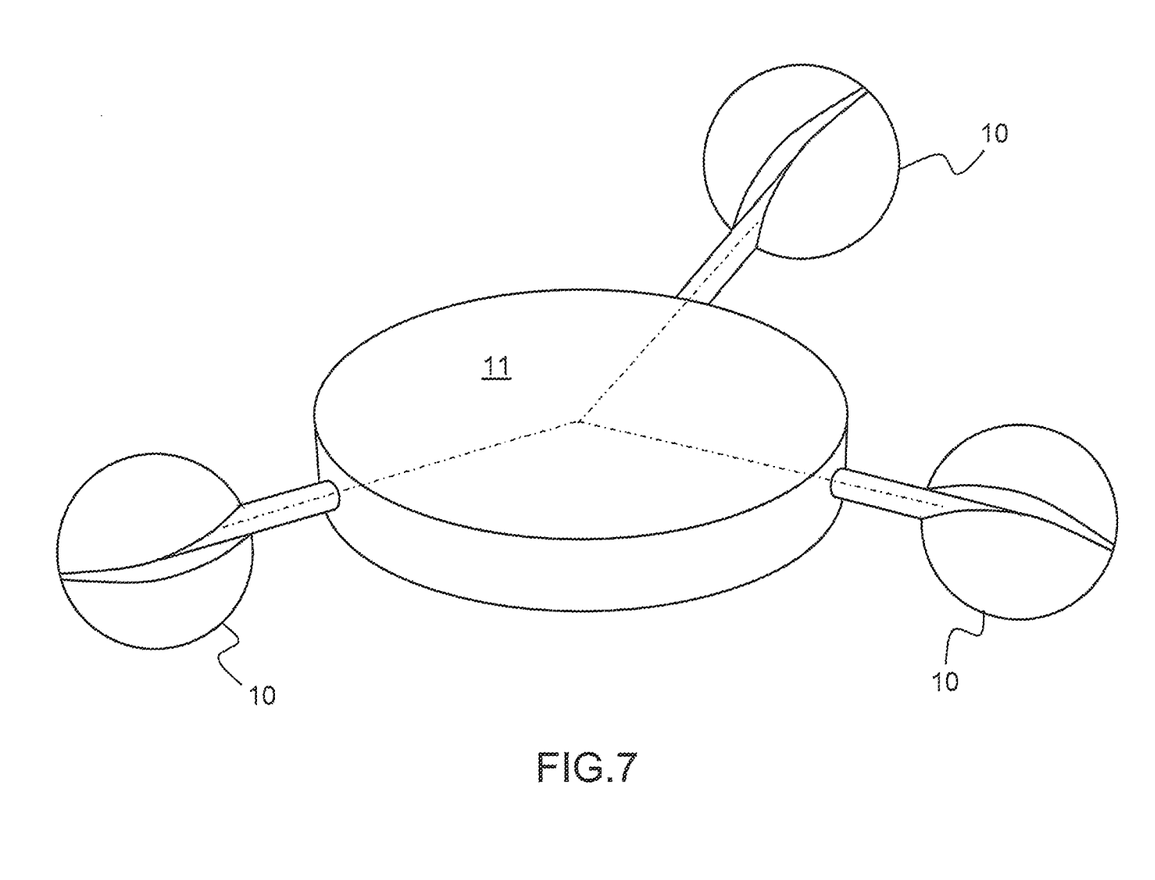
FIG. 7 represents an example of a vehicle equipped with a number of wheels of FIGS. 1 and 2.

FIG. 7 represents a vehicle 11 equipped with three wheels 10 according to the invention. This vehicle is for example a robot. It is also possible to apply the invention for vehicles comprising more than three wheels. For example, for a vehicle with four wheels, the axes of opposing wheels are situated in a same vertical plane relative to a horizontal ground, thus forming two pairs of wheels. The planes containing the axes of the two pairs of wheels are at right angles. More generally, the axes of the shafts of at least two wheels are not arranged in a same plane, which makes it possible for the vehicle to be moved in all the directions by keeping its wheels 10 on the ground 25 by means of suitable control.

The invention claimed is:

1. A spherical wheel configured to move a vehicle and be driven in rotation by a shaft rotating about an axis, the wheel comprising:
   first and second caps, each of the first and second caps having a surface that follows a spherical surface of the wheel and delimited by a plane, each of the first and second caps being articulated a pivot link relative to the shaft about an axis at a right angles to the plane of the each of the first and second caps; and
   first and second casters, each of the first and second casters arranged in an opening of the first and second caps, the openings being circular and centered about the axis of the corresponding pivot link, each of the first and second casters being arranged in an extension of the pivot link of one of the first and second caps, each of the first and second casters being free to rotate about an axis at right angles to the axis of the shaft, each of the first and second casters ensuring that the spherical wheel rolls,
   wherein a radius of the openings of each of the first and second caps and a radius of each of the first and second casters are defined to substantially balance forces needed to drive the first and second caps and the first and second casters when the spherical wheel goes from bearing on one of the first and second caps to bearing on one of the first and second casters.

2. The spherical wheel of claim 1, wherein a rolling line of the casters occupies an angular sector centered on the center of the spherical wheel and wherein the angular sector is greater than 35°.

3. The spherical wheel of claim 2, wherein the angular sector is less than 125°.

4. The spherical wheel of claim 2, wherein the angular sector is between 45° and 50°.

5. The spherical wheel of claim 1, wherein a greater radius of each of the first and second casters about its respective axis is greater than a quarter of the radius of the spherical wheel.

6. The spherical wheel of claim 5, wherein a greater radius of each of the first and second casters about its respective axis is greater than a third of the radius of the spherical wheel.

7. The spherical wheel of claim 6, wherein a greater radius of each of the first and second casters about its respective axis is equal to half the radius of the spherical wheel.

8. The spherical wheel of claim 1,
wherein, for each of the first and second caps, a friction torque $Cf_c$ is defined at a level of the pivot link between each of the first and second caps and the shaft,
wherein, for each of the first and second casters, a friction torque $Cf_r$ is defined in its freedom to rotate relative to the shaft, and
wherein the radii S of the opening of the first and second caps and r of the first and second casters are defined so that the following equality is substantially observed:
$$Cf_c/S = Cf_r/r.$$

9. The spherical wheel of claim 1, wherein the first and second caps and the first and second casters are defined to substantially balance kinetic energies of one the first and second caps and of the one of the first and second casters when the spherical wheel goes from bearing on the one of the first and second caps at an edge of the opening to bearing on the one of the first and second casters.

10. The spherical wheel of claim 9,
wherein, for each of the first and second caps, a moment of inertia $I_c$ is defined about an axis of the pivot link between the first and second caps and the shaft,
wherein, for each of the first and second casters, a moment of inertia $I_r$ is defined about a rotating axis relative to the shaft, and
wherein dimensions and materials of the first and second caps and of the first and second casters are defined for the following equality to be substantially observed:

$$\frac{Ic.\omega c}{2} = \frac{Ir.\omega r}{2}$$

$\omega_c$ representing a speed of rotation of the cap when the spherical wheel is bearing on one of the first and second caps at the edge of the opening, $\omega_r$ representing the speed of rotation of the caster when the wheel goes from bearing on the first and second caps at the edge of the opening to bearing on the caster.

11. The spherical wheel of claim 1, further comprising first and second covers associated with each of the first and second casters and fixed to the shaft, wherein the first and second covers form a portion of the spherical surface coming into the extension of the spherical surface of the first and second caps at the level of the opening through which said caster is arranged, wherein the first and second covers partly cover said first and second casters from said opening and wherein the first and second covers extend symmetrically relative to a rolling line of the first and second casters.

12. A vehicle, comprising at least three spherical wheels of claim 1, wherein axes of the shafts of at least two of the spherical wheels are not arranged in a same plane.

* * * * *